Jan. 13, 1970     J. W. WASELESKI, JR     3,489,884
HEATED WINDSHIELD WIPER AND BLADE THEREFOR
Filed Dec. 28, 1966
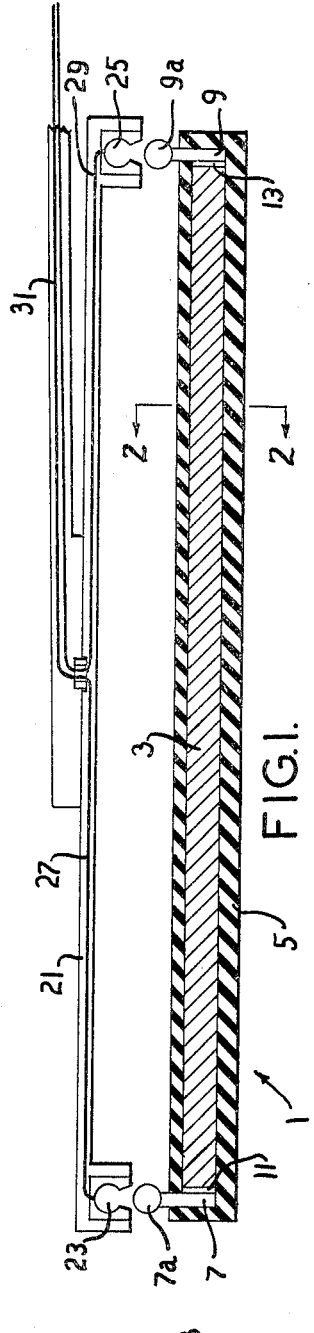
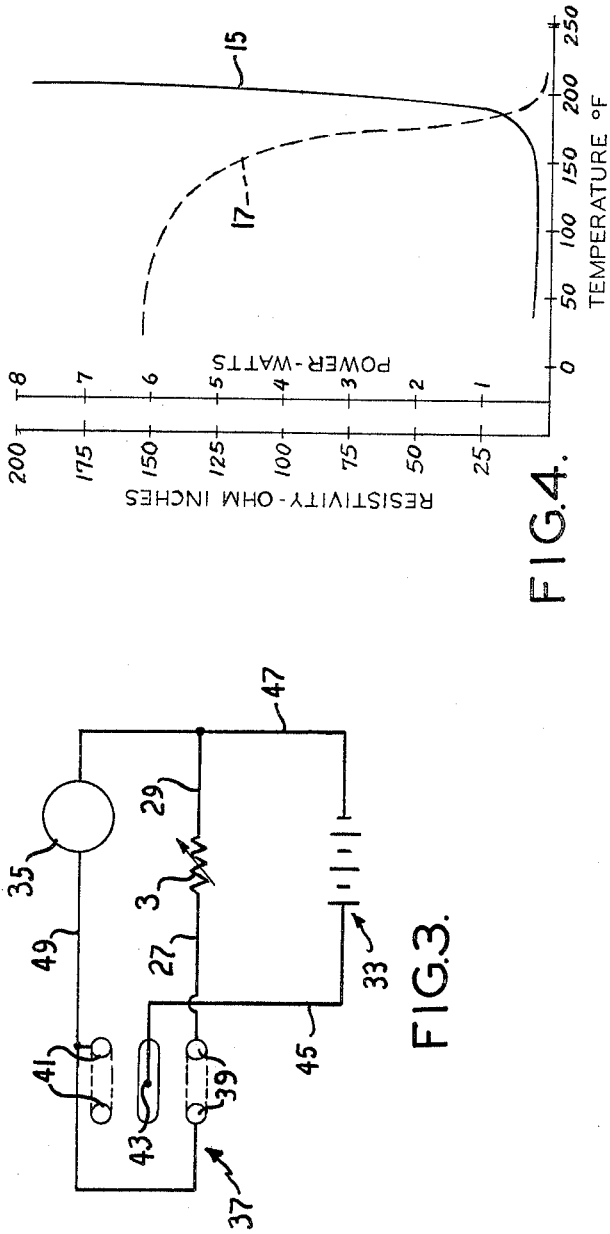
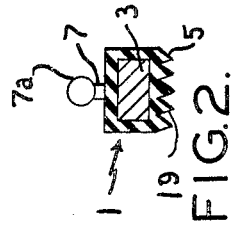

United States Patent Office 3,489,884
Patented Jan. 13, 1970

3,489,884
HEATED WINDSHIELD WIPER AND BLADE THEREFOR
Joseph W. Waseleski, Jr., Mansfield, Mass., assignor to Texas Instruments Incorporated, Dallas, Tex., a corporation of Delaware
Filed Dec. 28, 1966, Ser. No. 605,442
Int. Cl. H05b 3/06, 1/02; B60l 1/02
U.S. Cl. 219—522  2 Claims

ABSTRACT OF THE DISCLOSURE

A quick-detachable heated windshield wiper blade forming part of a windshield wiper is automatically controlled to be held at a substantially constant temperature by embedding within the blade a heating element of a material having a positive temperature coefficient of resistance (PTC) with a relatively sharply defined transition temperature above which the resistivity increases rapidly to effect a corresponding reduction in input power, thereby maintaining the wiper blade at the desired working temperature. Quick detachable electrical connecting means at the ends of the wiper blade mechanically and electrically connect the blade to the oscillatable blade holder of the vehicle.

BACKGROUND OF THE INVENTION

This invention relates to heated windshield wipers and quick-detachable blades therefor.

Such apparatus has previously been disclosed, for example, in the McCarthy U.S. Patent 1,937,286 which suggests the use of a bimetallic thermostatic switch member for controlling the temperature of a windshield wiper blade. Prior heated windshield wiper blades require separate temperature controlling means for operating the heating element, which increases the cost of the unit and constitutes a potential source of problems of repair, maintenance and adjustment for the correct temperature. On the other hand, if such controls are eliminated the blade may be heated to an excessive temperature and heating may occur during periods when it is not needed.

SUMMARY OF THE INVENTION

Among the several objects of the invention may be noted the provision of a heated windshield wiper blade wherein the temperature of the blade is automatically controlled at a substantially constant temperature without the need for temperature control means separate from the heating element; the provision of a heated windshield wiper blade wherein the temperature to which the blade is heated is dependent only upon the resistance characteristics of the heating element; and the provision of such a wiper blade which is self-regulating in operation. Other objects and features will be in part apparent and in part pointed out hereinafter.

A windshield wiper blade of the invention comprises a pair of contacts adapted to be connected in an electrical circuit. A mass of semiconductor thermistor material is positioned between the contacts. The material has a PTC resistance characteristic including a sharply defined transition temperature above which the material's resistance increases sharply. When the contacts are connected to a source of electrical energy to energize the material, its temperature increases to the transition temperature and then becomes substantially constant at that temperature. Wiper means associated with the material is adapted to engage a windshield.

The invention also contemplates an oscillating wiper arm carrying circuitry with which the blade has a quick-detachable electrical connection.

BRIEF DESCRIPTION OF THE DRAWINGS

FIG. 1 is a view, partially in section and partially exploded, showing a heated windshield wiper and blade of the invention;

FIG. 2 is a section taken along line 2—2 of FIG. 1;

FIG. 3 is an electrical schematic diagram illustrating one manner of connecting the wiper blade in an electrical circuit; and FIG. 4 is a graph plotting the resistivity and power against temperature to show the positive temperature coefficient characteristics of a material useful in constructing the wiper blade.

Corresponding reference characters indicate corresponding parts throughout the several views of the drawings.

DESCRIPTION OF THE PREFERRED EMBODIMENT

A windshield wiper made according to this invention is generally designated 1 and comprises a central heating element 3 surrounded by an insulating cover 5 of flexible wiper material which may be composed of an elastomer such as rubber or the like to function as a wiper as well as an insulator. Each of electrically conductive terminal or contact members 7 and 9 at the ends of the heater element 3 is terminated by a projecting connecting head portion designated 7a and 9a. Contacts 7 and 9 are secured in conventional manner to the heating element 3 by conductive material, as shown at 11 and 13, so that an electric current can be passed from contacts 7 through the heating element 3 to contact 9.

The heating element 3 is generally in the shape of a bar contained in material 5 as shown in FIGS. 1 and 2. The heater element is constituted by a thermistor composed of a mass of semiconductor material having a positive temperature coefficient of resistivity characteristic (PTC) which includes a relatively sharply defined or abrupt transition temperature above which the resistivity increases rapidly. The PTC thermistor heater element has the characteristic that, when a voltage above a predetermined level is applied thereto, the element heats to the transition temperature and remains at that temperature despite appreciable variations in the heat dissipated from the heater or in the voltage supplied to the heater. The temperature at which the resistivity changes abruptly is determined by the Curie point of the material.

Any suitable material having the desired PTC characteristic may be used for the heater element 3. For example, the element may be made of carbon-black-filled, cross-linked polyethylene, barium titanate or carbon-black-filled ethylene vinyl acetate.

FIG. 4 illustrates the PTC characteristics of carbon-black-filled, cross-linked polyethylene. The solid line 15 designates the resistivity and the dashed line 17 designates the power input. This diagram shows that the resistivity of the material is low until its temperature increases to between 150° to 200° F., at which temperature there is a sharp break in the resistivity which increases rapidly to a high value. The same figure also shows that the input power through the material is relatively high at low temperatures of the material, due to the then low resistivity of the material, but that the power input decreases sharply between 150° and 200° F. until it is of a very low value when the element is heated above its transition temperature. Thus the increase in resistivity is accompanied by a corresponding decrease in power input. FIG. 4 graphically illustrates that during initial operation, when deicing on the windshield is required, the resistance of the heater 3 is low and the input power high, thereby rapidly heating the windshield wiper blade to effect deicing of the windshield by heat transfer through material 5 to the windshield. However, when the temperature increases to about 200° F., at which temperature ice or sleet should melt from the windshield, further temperature increase is prevented by the controlling action of the thermistor material 5. Thus it will be seen that the wiper blade of the invention is self-regulating substantially at the desired elevated temperature. The ambient temperature and the rate-of-heat transfer from the wiper blade heating element through material 5 to the windshield will determine the power input required to maintain equilibrium. Preferably the portion of the material 5 which is engageable with the windshield has a plurality of wiping ribs 19 (FIG. 2) to increase the rate of heat transfer to the windshield.

The windshield wiper blade is attached to a blade holder 21 having at the end portions thereof a pair of insulated semispherical socket-shaped contact spring clip members 23 and 25 into which the contact portions 7a and 9a may be snapped respectively. Insulated power leads 27 and 29 are connected to the sockets 23 and 25, respectively, and to a source of power such as a vehicle battery, to provide electric current to the conductive sockets and then through contacts 7 and 9 to the heater 3 to effect the heating of the wiper blade. The leads 27 and 29 are shown positioned in a wiper arm 31 which is oscillating relative to the windshield by a motor in the usual and conventional manner.

FIG. 3 illustrates a circuit for operating the windshield wiper blade of the invention. The circuit includes a battery 33 which may be a conventional vehicle battery. The battery is normally connected to a motor 35 for driving the windshield wiper arm 31 to effect movement of the wiper blade across the windshield. Normally where no heating is required this may be done by a simple one-position switch. The switch means generally designated 37 in FIG. 3 provides means for either connecting only the motor 35 in the circuit or for connecting both the motor and the heating element 3 in the circuit. Switch 37 has a lower pair of contacts 39 and an upper pair of contacts 41. It also has a movable center contact 43 which is adapted to be moved into engagement with either of the pairs of contacts 39 and 41 to bridge these contacts and complete a circuit therebetween. The movable contact 43 is connected by a conductor 45 to one terminal of battery 33 and the other terminal of the battery is connected by a conductor 47 to the wiper motor. The wiper motor is connected by a conductor 49 both to one of the contacts 41 and to one of the contacts 39. The other contact 39 is connected by power lead 27 to the PTC heating element 3 and the other power lead 29 is connected to the conductor 47. When the movable contact 43 is moved into engagement with the pair of contacts 41, a circuit is completed from battery 33 through motor 35 only, useful for warm weather operation. However, when the movable contact is moved into engagement with the pair of contacts 39 to bridge them, a circuit is completed both through the motor 35 and through the heating element 3 so that they are simultaneously energized for cold-weather operation. Thus during periods when icing conditions do not exist the heating element may be taken out of the circuit and the wiper motor only used. The circuit of FIG. 3 is shown by way of illustration only and various other means may be utilized for connecting the heating element in the desired circuit. Because the heating element 3 is composed of a PTC material having a sharply increasing resistance at the transition temperature, it is not necessary to provide other regulating means as is usually required with heated windshield wiper blades. Thus the blade is substantially self-regulating during operation.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. An electrically heated windshield wiper comprising an elongate oscillatable blade holder, an elongate wiper blade, quick-attachable and -detachable electrical connecting means located substantially at the ends of the blade and the blade holder, conductive means carried by the blade holder for supplying electrical power to said endwise connecting means, said blade comprising an elongate heating element of semiconductor material having a positive temperature coefficient of resistance including a range wherein resistance to electrical current rises abruptly with temperature increase to attain and hold a temperature substantially constant at a desired value compatible for heating glass without breakage and with reduction in input electric power, an insulating cover of elastomeric wiper material surrounding said bar and in close heat-exchange relationship therewith, said connecting means forming the sole mechanical connection between the wiper blade and the blade holder whereby the connecting means not only supply power to the heating element, but also mechanically secure the wiper to the holder.

2. A windshield wiper according to claim 1, wherein said semiconductor material is selected from the group consisting of carbon-black-filled polyethylene, carbon-black-filled ethylene vinyl acetate and barium titanate and said elastomeric insulating material includes at least one rib engageable with a windshield.

References Cited

UNITED STATES PATENTS

| | | | |
|---|---|---|---|
| 1,101,821 | 6/1914 | Van Aller. | |
| 1,642,570 | 9/1927 | Wood et al. | |
| 1,643,067 | 9/1927 | Goodman | 15—250.09 |
| 2,322,312 | 6/1943 | Osborn | 15—250.07 |
| 2,427,502 | 9/1947 | Marick | 15—250.06 |
| 2,861,163 | 11/1958 | Asakawa. | |
| 3,243,753 | 3/1966 | Kohler | 338—22 X |
| 3,249,959 | 5/1966 | Theckston | 219—203 X |
| 3,338,476 | 8/1967 | Maroux | 219—505 X |
| 3,351,882 | 11/1967 | Kohler et al. | 252—511 X |
| 3,408,678 | 11/1968 | Linker | 15—250.05 |

ANTHONY BARTIS, Primary Examiner

U.S. Cl. X.R.

15—250.05; 219—203, 505; 252—511; 338—22